Figure 1:
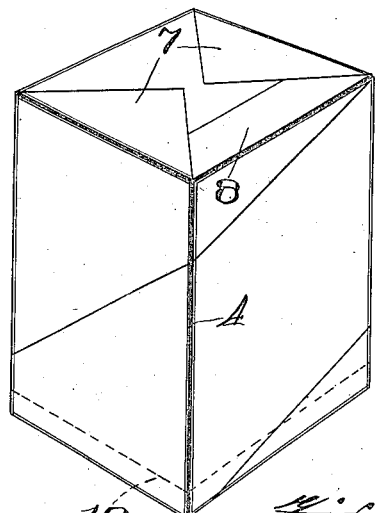

C. F. JENKINS.
SPIRALLY WOUND-COLLAPSIBLE RECEPTACLE.
APPLICATION FILED JUNE 2, 1909.

952,258.

Patented Mar. 15, 1910.

3 SHEETS—SHEET 1.

Witnesses
B. M. Offutt
Jas. E. Dodge

Inventor
C. Francis Jenkins
by Wilkinson Fisher &
Wilkinson
Attorneys

C. F. JENKINS.
SPIRALLY WOUND COLLAPSIBLE RECEPTACLE.
APPLICATION FILED JUNE 2, 1909.
952,258.
Patented Mar. 15, 1910.
3 SHEETS—SHEET 2.
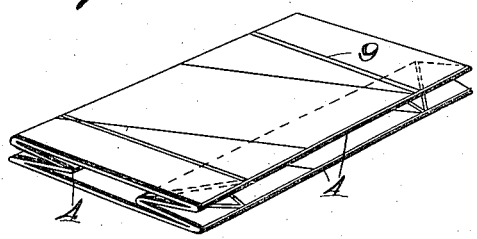
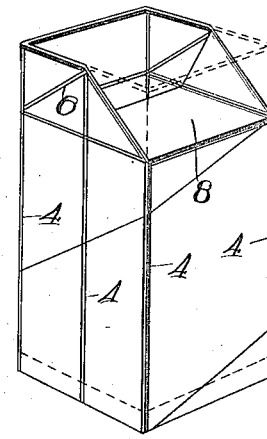
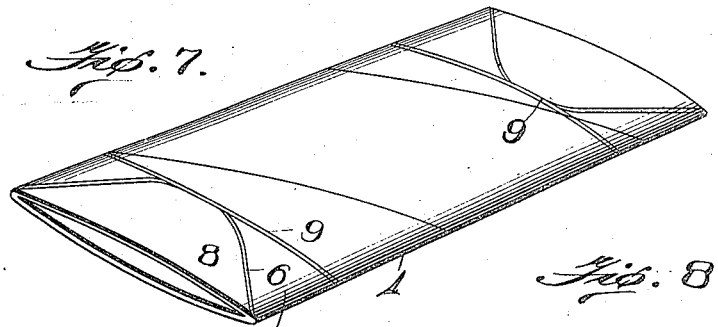
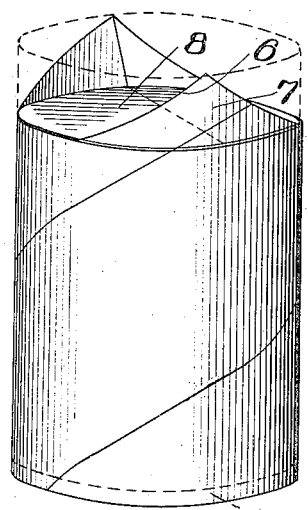
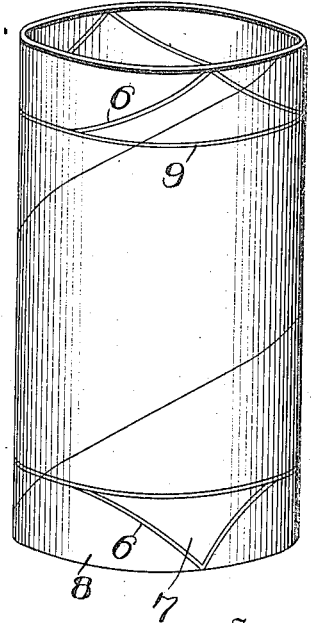

C. F. JENKINS.
SPIRALLY WOUND COLLAPSIBLE RECEPTACLE.
APPLICATION FILED JUNE 2, 1909.
952,258.
Patented Mar. 15, 1910.
3 SHEETS—SHEET 3.
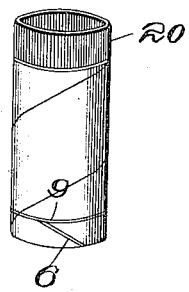
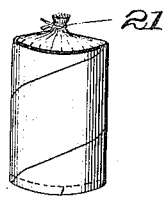
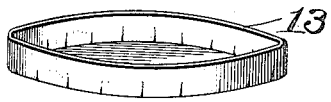
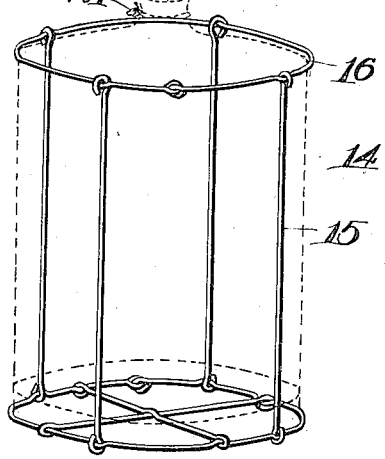
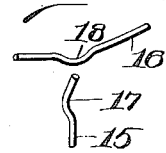
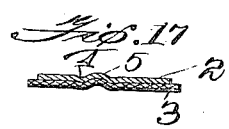

UNITED STATES PATENT OFFICE.

CHARLES FRANCIS JENKINS, OF WASHINGTON, DISTRICT OF COLUMBIA, ASSIGNOR TO SINGLE SERVICE PACKAGE CORPORATION OF AMERICA, OF NEW YORK, N. Y., A CORPORATION OF NEW JERSEY.

SPIRALLY-WOUND COLLAPSIBLE RECEPTACLE.

952,258.  Specification of Letters Patent.  Patented Mar. 15, 1910.

Application filed June 2, 1909. Serial No. 499,691.

*To all whom it may concern:*

Be it known that I, CHARLES FRANCIS JENKINS, a citizen of the United States, residing at Washington, in the District of Columbia, have invented certain new and useful Improvements in Spirally - Wound Collapsible Receptacles; and I do hereby declare the following to be a full, clear, and exact description of the invention, such as will enable others skilled in the art to which it appertains to make and use the same.

This invention relates to spirally wound collapsible retainers, and especially to spirally wound collapsible bags of a large size, in which cheapness of construction, combined with great strength, is an important consideration.

Spirally wound barrels, and boxes or bottles are well known, but in neither case are they collapsible or capable of being shipped or stored in a small space; nor are they provided with bottom or top closures integral with, or made in one piece with the body of the bag, which feature of construction greatly lessens the cost of closing bag like receptacles. Spirally wound tubes are, also, well known, but they, like the boxes or barrels above mentioned, are not readily collapsible or capable of being stored or shipped in a small space, nor are they at all adapted for shipping substances in bulk.

By spirally winding a bag like receptacle of large size, on the other hand, since the spirally wound strips overlap or break joint, the bag is rendered in fact seamless, so that all parts take equal strains, and no one part is more liable to split than is another, which is not the case with bags provided with seams. Furthermore, since the individual strips of which the bag is composed run diagonally in opposite directions on the inside and outside of the bag they each mutually brace, or strengthen, any weak places that may develop in the other, and it is found that a spirally wound bag has in fact more strength for the same material than has an ordinary bag. The glue or other cementing material which holds the several parts together, also, greatly aids in giving strength to the receptacles as an entirety.

Figure 2:
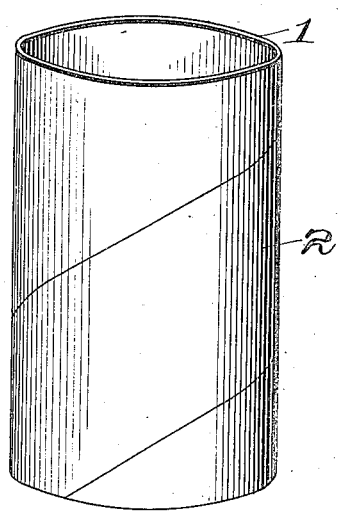
Figure 4:
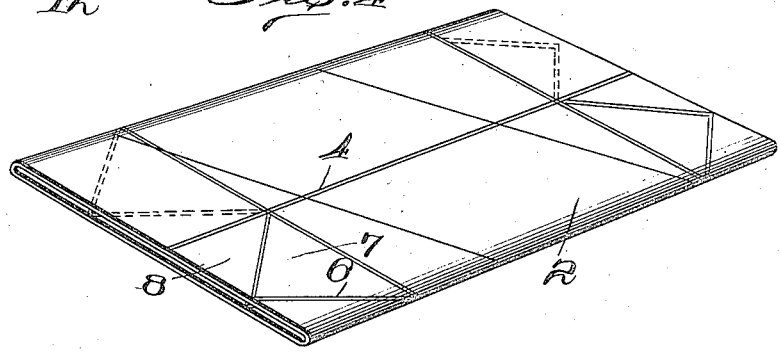
Figure 3:
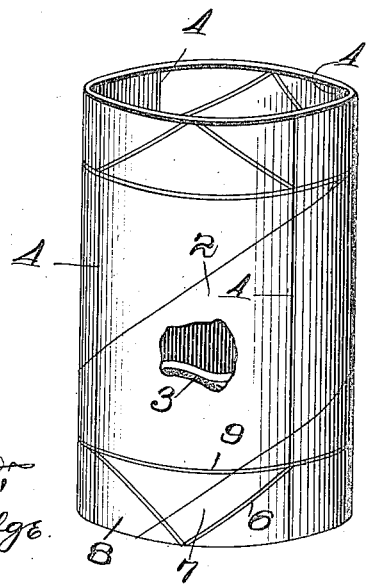

Referring to the accompanying drawings forming a part of this specification:—Figure 1, is a perspective view of a spirally wound bag like container with its ends closed, and of a square or rectangular form; Fig. 2, represents the spirally wound tube out of which cylindrical bag like receptacles may be formed; Fig. 3, represents the same tube suitably scored or provided with four longitudinal weakened lines, enabling the same to be folded into a rectangular or square like form, as shown in Fig. 1; Fig. 4, represents the same tube collapsed; Fig. 5, represents a similar tube provided with six longitudinal weakened lines and in its collapsed condition; Fig. 6, represents a rectangular or square like bag formed from the tube shown in Fig. 5; Fig. 7, represents a tube in its collapsed condition similar to that shown in Fig. 2, but provided with only two longitudinal weakened lines; Fig. 8, represents the same tube extended and ready to have its end closures folded in to form the cylindrical receptacle shown in Fig. 9; Fig. 9, shows the tube represented in Fig. 8 with its bottom closed and its top partially closed; Fig. 10, represents a tube which may be scored in any of the above mentioned ways, and having its top portion creased or the fibers of the same broken down in order to render the same capable of being easily tied; Fig. 11, shows the completed receptacle formed from closing the ends of the tube shown in Fig. 10; Fig. 12, shows an independent and readily detachable strengthening closure which may be inserted in any one of the rectangular forms when great strength in the bottom is required; Fig. 13, represents a similar independent strengthening closure for the cylindrical form of the bag; Fig. 14, represents a suitable reinforcing strengthening frame work into which the large bags may be inserted, when they are to be used as barrel like receptacles; Fig. 15, is a detail of the joints between the parts showing the said frame work; and, Figs. 16, 17, and 18, are details of the walls and scorings of the various receptacles.

Like numerals indicate like parts in all the views.

1, represents the body part composed of the spirally wound strips 2, which are preferably overlapped and are caused to break joint with each other, as is usual in spirally wound tubes. These strips may be two or more in number, and one or more of the said strips may be composed of a fabric such as cloth 3, or one or more may be composed of any other suitable strengthening material, all as shown in Figs. 3 and 17. When three strips are used it is preferable that the middle strip shall be of cloth, as best shown in Fig. 18. These tubes are made in a continuous manner and at a high rate of speed on the well known machines for making spirally wound tubes, and are automatically cut off into suitable lengths. After the tubes are cut off they are then suitably scored or provided with weakened lines by subjecting the said tubes to a suitable machine, or in any other well known manner. It is preferred that these weakened lines shall be of the well known nature of the scorings 4, see Figs. 16, 17, and 18, and not of such a nature as to cut or break the fiber of the paper, or other material composing the walls of the receptacles. These scorings are preferably in pairs, and are provided with the raised portion 5 between each pair of the weakened lines 4, in order that the paper may readily yield without breaking the fibers.

In all cases the bottoms of the receptacles are provided with the well known diagonal folding weakening lines 6, to form the triangular flaps 7, and the other flaps 8, as is ordinarily the case in paper bags now in use; and in addition to these diagonal lines 6 circumferential lines 9, are also provided. The lines 6 and 9 enable the flaps to fold over in a natural manner and to close the bag in the usual way. But when the bags are of a very large size I prefer in most cases not to secure the flaps together, in order that the same may be straightened out and enable the tube as a whole to be better folded for shipment or storage as shown in Fig. 4, for example. When, however, it is desired, these bottom flaps may be permanently secured together either by glue or by metallic fastenings, or the whole may be collapsed or not, as desired. Whenever the contents of the bag are such that an unusual strength is needed at the bottom, the independent additional closures 12 and 13 may be inserted and rest immediately above the folded-in flaps, as indicated by the dotted lines in Figs. 1 and 9. Likewise when the contents are such as to require additional strength to the walls of the receptacle, the said walls may be inserted in a wire or other cage 14, as illustrated in Fig. 14. This strengthening envelop 14 will be found very useful when the bag is to be used as a barrel from which flour, potatoes or other material is to be retailed. It will also be found very useful when the barrel-like bag is to be used in storing potatoes, seeds or other material in ware houses where the receptacles are liable to be moved from time to time. In order to render these cages 14 capable of being knocked down and shipped or stored in small space, I prefer to attach the rods 15 to the bands 16 by simply matching the indentations 17 and 18 with which the said parts are provided, and then bending over the ends of the rods 15, as shown in Fig. 14.

In some cases it will be found desirable to close the mouths of the bags by simply tying the same with strings, as is now usually done; and for such contingencies the mouths 20 of said bags are crimped, fluted, or have the fibers of the material otherwise broken down, so as to render the same soft and pliable, and they are then gathered together and tied, as shown at 21 in Figs. 11 and 14.

In other cases the bags may be simply closed by means of folding over the top flaps and cementing the same, or by fastening the same with suitable mechanical fasteners, or they may be even closed by folding over said flaps and binding over the whole package with cord or wire, as is ordinarily done with smaller bags.

The triple wall provided with a middle layer of cloth shown in Fig. 18, is especially adapted for bags to contain cement or other heavy material, while the other bags disclosed, as well as the said bag disclosed in said Fig. 18, are especially adapted for flour and material of that nature. The bags of a barrel-like size, whatever the composition of their walls, will be found especially useful for fruits, vegetables and the storing of grain. It is also evident that by suitably perforating the walls of these barrel like bags, so as to provide ventilation, the same would be especially adapted for holding fruit during transportation.

While I have shown certain differences of structure in the various features, it will be understood that such differences are by way of example only and may be freely interchanged and applied to the bags of the other figures. For example, the bag having the flexible mouth closure shown in Fig. 14, need not have that particular closure at all, for the reinforcing wire envelop is equally serviceable with any other style of spirally wound bag; and the same is true of the various styles of scorings and folds shown on the various bags.

It will be observed that bags of any desired size may be made from any desired material found suitable, and that as the machines for making spirally wound tubes can be operated continuously at a high speed, these bags of great capacity and of a much greater strength than heretofore can be made at a cost very little above that of the material, so as to compete with the present bag.

What I claim is:—

1. A collapsible bag, provided with a mouth adapted to be closed by folding, and having its walls composed of spirally wound material; substantially as described.

2. A seamless spirally wound collapsible bag, provided with collapsible closures at each end; substantially as described.

3. A spirally wound bag having collapsible top and bottom closures integral with its body portion; substantially as described.

4. A spirally wound bag having its body portion provided with longitudinal weakened folding lines; and its bottom closure integral with said body portion; substantially as described.

5. A collapsible bag having a collapsible end closure; and walls each composed of a plurality of spirally wound strips; substantially as described.

6. A collapsible bag having its walls and bottom closure composed of a plurality of spirally wound strips, one of which is a fabric; substantially as described.

7. A collapsible bag, having its walls and bottom closure composed of a plurality of spirally wound strips, one of which is a fabric; and provided with weakened folding lines; substantially as described.

8. A collapsible bag having its body portion and its bottom integral with each other and each composed of spirally wound strips, suitably provided with weakened lines to permit folding; and an independent reinforcing bottom closure adapted to be inserted in said bag; substantially as described.

9. A seamless collapsible bag having its body portion and its bottom composed of spirally wound strips; and its top portion having its fibers broken down to permit tying; substantially as described.

10. A seamless collapsible bag having its body portion and its bottom composed of spirally wound strips, one of which is made of fabric; and its top portion having its fibers broken down to permit tying; substantially as described.

11. A seamless collapsible spirally wound bag, provided with an integral collapsible top closure; in combination with a reinforcing cage, into which said bag fits; substantially as described.

12. A seamless collapsible spirally wound bag, provided with a reinforcing independent bottom; a flexible integral top closure; and a reinforcing cage into which said bag fits; substantially as described.

In testimony whereof, I affix my signature, in presence of two witnesses.

CHARLES FRANCIS JENKINS.

Witnesses:
ARTHUR L. BRYANT,
T. A. WITHERSPOON.